US008518529B2

(12) United States Patent
Kondo

(10) Patent No.: US 8,518,529 B2
(45) Date of Patent: Aug. 27, 2013

(54) WOODY RESIN MOLDING, POLISHED WOODY RESIN, AND PROCESSES FOR PRODUCING THE SAME

(75) Inventor: Masaaki Kondo, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 302 days.

(21) Appl. No.: 12/519,039

(22) PCT Filed: Dec. 13, 2007

(86) PCT No.: PCT/JP2007/074055
§ 371 (c)(1),
(2), (4) Date: Jul. 24, 2009

(87) PCT Pub. No.: WO2008/072708
PCT Pub. Date: Jun. 19, 2008

(65) Prior Publication Data
US 2010/0021715 A1 Jan. 28, 2010

(30) Foreign Application Priority Data
Dec. 13, 2006 (JP) ................................ P2006-335670

(51) Int. Cl.
B32B 3/26 (2006.01)
B32B 27/00 (2006.01)
B32B 17/10 (2006.01)
(52) U.S. Cl.
USPC ...................... 428/304.4; 428/319.9; 428/339
(58) Field of Classification Search
USPC ................................. 428/304.4, 319.9, 339
See application file for complete search history.

(56) References Cited

U.S. PATENT DOCUMENTS
3,355,769 A * 12/1967 Fogelberg ..................... 425/208
2008/0113190 A1 * 5/2008 Keller et al. .................. 428/339

FOREIGN PATENT DOCUMENTS
JP 11277664 A * 10/1999
(Continued)

OTHER PUBLICATIONS
English translation of JP 11-277664.*
(Continued)

Primary Examiner — Victor Chang
(74) Attorney, Agent, or Firm — Birch, Stewart, Kolasch & Birch, LLP

(57) ABSTRACT

The present invention provides a method for manufacturing a woody resin molded body which comprises a step of passing a woody resin composition containing a thermoplastic resin, a cellulose powder and a blowing agent, a weight ratio of the thermoplastic resin to the cellulose powder being from 20/80 to 80/20, through a shaping die that has no core body and extruding the woody resin composition into a cooling die. A barrel temperature of an extrusion molding machine is set lower than a foaming temperature of the blowing agent, and a temperature of the shaping die is set within a foaming temperature range of the blowing agent, to thereby obtain a woody resin molded body which has a high-expanded foam layer and a low-expanded foam layer formed on the outside of the high-expanded foam layer and in which the cellulose powder is not exposed on a surface of the low-expanded foam layer. In accordance with the present invention, a woody resin molded body is provided that is lightweight and similar to natural wood in secondary processability such as nail driving and screw tightening. The woody resin molded body is free from appearance defects such as streak patterns caused by the presence of weld lines on the surface, and strength problems such as surface cracking, excels in product rigidity and strength, and can be produced with good efficiency by extrusion molding.

7 Claims, 4 Drawing Sheets

(56) References Cited

FOREIGN PATENT DOCUMENTS

| | | |
|---|---|---|
| JP | 2000-355042 A | 12/2000 |
| JP | 2004-167799 A | 6/2004 |
| JP | 2004-314371 A | 11/2004 |
| JP | 2004-314372 A | 11/2004 |
| JP | 3626112 B2 | 3/2005 |

OTHER PUBLICATIONS

Office Action issued in corresponding Japaense Patent Application No. 2008-549366, dated Feb. 12, 2013.
Sawada, Keijl, "Newest Technology in Extrusion Molding of Plastics," pp. 239-241, Jun. 25, 1993, Rubber Digest Co. Ltd., Japan.

* cited by examiner

PRIOR ART

WOODY RESIN MOLDING, POLISHED WOODY RESIN, AND PROCESSES FOR PRODUCING THE SAME

TECHNICAL FIELD

The present invention relates to a woody resin molded body used for applications for which wood materials have been conventionally used, such as decks, fences, pergolas, wisteria trellises, outdoor furniture, signboards, gate posts, gate doors, and composters.

BACKGROUND ART

A variety of woody resin molded bodies and molding methods therefor have been developed, and hollow molded bodies or foam molded bodies composed of woody resins have been developed to reduce weight. When nails are driven or screws are tightened in such hollow molded bodies, however, it is necessary to take account of the hollow portion, and market requirements are not necessarily fully satisfied in terms of secondary processability. Furthermore, in a case where hollow molded bodies are used as exterior materials, the applicational operations are troublesome because the end surfaces of the hollow portion have to be closed with a cover to improve appearance.

Meanwhile, in the case of foam molded bodies, when the foaming ratio is increased to reduce the molded body weight, mechanical strength is reduced. Conversely, when the foaming ratio is set low to maintain strength, light weight for molded body cannot be obtained. Because of this dilemma, the foam molded bodies also do not necessarily fulfill market requirements.

As methods for resolving simultaneously the problems associated with the molded body weight and secondary processability, a molding method for initially molding a woody resin molded body having a hollow structure and then injecting a foamed resin into the hollow portion thereof, and a method for co-extrusion molding a non-foamed layer of a woody resin composition on the outside and a high-expanded foam layer of identical or different resin on the inside, have recently been suggested. However, productivity is difficult to improve by the former method because the process involves two stages. The latter method is technologically difficult because it involves co-extrusion molding, and in addition, productivity is difficult to improve compared with the usual extrusion molding.

Patent Documents 1 and 2 disclose molded bodies having a structure in which the density in the cross section of the molding increases from the central portion to the surface, these molded bodies being advantageous in terms of weight, secondary processability such as nail driving and screw tightening, and product strength. However, because these molded bodies are formed using a profile extrusion die having a core body, weld lines caused by a fixing member serving to fix the core body to the die are inevitably formed in the surface layer. As a result, market requirements are not sufficiently satisfied in terms of aesthetic properties and strength. Furthermore, in some cases deterioration of weather resistance or extension-shrinkage movement in linear expansion cause disaggregation of weld lines on the aesthetic surface, thereby decreasing strength and rigidity. In particular, water penetrates into the disaggregated weld lines in exterior applications, dust is retained therein, mold appears, and beauty of appearance is lost. Accordingly, a demand has been created for a method for resolving these problems.

Patent Document 1: Japanese Patent No. 3626112.
Patent Document 2: Japanese Patent Application Laid-Open No. 2004-314372.

DISCLOSURE OF THE INVENTION

Problems to be Solved by the Invention

In view of the above-described problems inherent to related art, it is an object of the present invention to provide a woody resin molded body that has good balance of lightweightness, rigidity, and strength, in particular makes it unnecessary to be concerned with decrease in strength caused by disaggregation on a aesthetic surface and penetration of water when used as an exterior material, and also can be produced with good efficiency by an extrusion molding machine.

Means for Solving the Problem

The inventors created the present invention on the basis of comprehensive research.

The woody resin molded body in accordance with the present invention contains a thermoplastic resin and a cellulose powder at a weight ratio of 20/80 to 80/20 and is characterized in that the woody resin molded body has a high-expanded foam layer and a low-expanded foam layer formed on the outside of the high-expanded foam layer, and the cellulose powder is not exposed on a surface of the low-expanded foam layer.

The woody resin polished body in accordance with the present invention is characterized in that the woody resin polished body is obtained by polishing at least part of the low-expanded foam layer of the woody resin molded body, and has a surface on which the cellulose powder is exposed.

The method for manufacturing a woody resin molded body in accordance with the present invention, comprising a step of passing a woody resin composition containing a thermoplastic resin, a cellulose powder and a blowing agent, a weight ratio of the thermoplastic resin to the cellulose powder being from 20/80 to 80/20, through a shaping die that has no core body and extruding the woody resin composition into a cooling die, is characterized in that a barrel temperature of an extrusion molding machine is set lower than a foaming temperature of the blowing agent, and a temperature of the shaping die is set within a foaming temperature range of the blowing agent. The cooling die is preferably connected to the shaping die, and the cooling die and shaping die may be integrated and linked. Furthermore, the extrusion molding machine is preferably connected to the shaping die.

The method for manufacturing a woody resin polished body in accordance with the present invention is characterized in that the method comprises manufacturing the woody resin molded body in accordance with the present invention, and polishing at least one surface of the woody resin molded body to expose the cellulose powder.

Effects of the Invention

Because the woody resin molded body in accordance with the present invention has a high-expanded foam layer and a low-expanded foam layer that is positioned on the outside of the high-expanded foam layer, the molded body excels in a balance of lightweightness and rigidity-strength. Furthermore, according to the method for manufacturing a woody resin molded body in accordance with the present invention, profile foaming and extrusion molding can be integrally performed using a shaping die having no core body. Therefore, molding can be performed without the occurrence of substantial interface or weld lines on the aesthetic surface.

Furthermore, because the woody resin polished body in accordance with the present invention is manufactured by polishing the woody resin molded body in accordance with the present invention, excellent coatability can be attained in addition to providing excellent properties inherent to the woody resin molded body in accordance with the present invention.

BEST MODES FOR CARRYING OUT THE INVENTION

Explanation of Reference Numerals

1: low-expanded foam layer; 2: high-expanded foam layer; 3: boundary layer; 4: shaping die; 5: cooling die; 6: barrel of extrusion molding machine; 7: breaker plate; 8: heater; 9: air piping for air cooling the die; 10: piping for water cooling the die; 11: low-friction processed layer of inner wall of the die; 12: fixing member of core body; 13: core body.

BEST MODE FOR CARRYING OUT THE INVENTION

[1] Woody Resin Molded Body

The woody resin molded body in accordance with the present invention basically has a high-expanded foam layer of a low specific gravity that is positioned on the inside and a low-expanded foam layer of a high specific gravity that is positioned on the outside of the high-expanded foam layer and has a surface in which a cellulose powder is not exposed on the low-expanded foam layer surface. Furthermore, the woody resin molded body preferably has an inner structure having a boundary layer in which a specific gravity varies drastically in the thickness direction of the molded body, between the high-expanded foam layer and low-expanded foam layer. The state of the surface of the low-expanded foam layer where the cellulose powder is not exposed, as referred to herein, is specifically a state in which the exposure of cellulose powder cannot be visually recognized and an arithmetic average roughness Ra obtained by measuring surface roughness according to JIS B0601-1994 with a surface roughness meter is equal to or less than 5 μm, preferably equal to or less than 1 μm, and even more preferably equal to or less than 0.5 μm. The entire circumference (surface other than the end surface) of the woody resin molded body in accordance with the present invention is preferably covered by the low-expanded foam layer, but there may be a portion that is not covered by the low-expanded foam layer.

Figure 1:
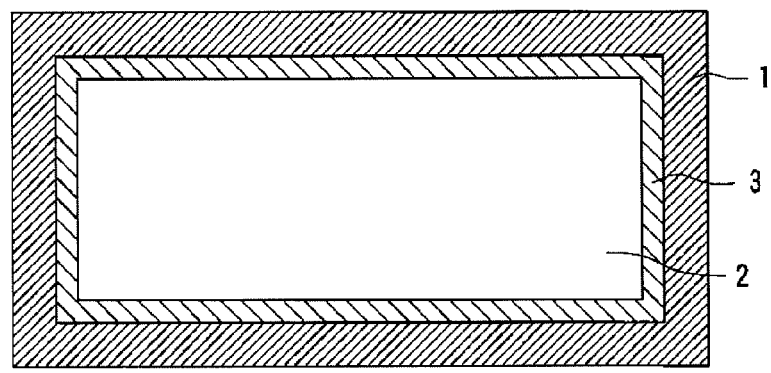
FIG. 1 shows an example of schematic cross-sectional view of the woody resin molded body in accordance with the present invention.

The low-expanded foam layer is by itself a high-strength portion, and the molded body can be made mechanically strong by disposing this high-strength portion in the outer shell of the molded body cross section, that is, employing a design useful for obtaining a section modulus in mechanics of materials. An exemplary cross section of the woody resin molded body in accordance with the present invention is shown in FIG. 1. This cross-sectional view is taken in the direction perpendicular to the extrusion direction during extrusion molding. In this figure, the reference numeral 1 represents a low-expanded foam layer, 2 represents a high-expanded foam layer, and 3 represents a boundary layer.

The woody resin molded body shown in FIG. 1 is obtained by integral profile foaming and extrusion molding. Therefore, the high-expanded foam layer and low-expanded foam layer are linked continuously without an interface. However, specific gravity varies (increases from the inside toward the outside) drastically between the high-expanded foam layer and low-expanded foam layer, whereas the specific gravity is almost uniform inside the high-expanded foam layer and low-expanded foam layer respectively. Furthermore, the high-expanded foam layer and low-expanded foam layer of the woody resin molded body are distinctly present, so that they can be visually recognized, on the end surface of the molded body, that is, in the cutting plane.

Therefore, the woody resin molded body in accordance with the present invention has a structure different from that of the conventional foam molded body that has been foamed to have a uniform specific gravity from the central portion to the outer surface portion of the molded body or the conventional foam molded body in which the specific gravity increases linearly, that is, in a linear fashion, from the central portion toward the outside, as shown in Patent Document 2.

Each of the high-expanded foam layer and low-expanded foam layer in the woody resin molded body shown in FIG. 1 can be distinctly visually recognized, and a transient region, that is, a boundary layer, present between the two layers is a little indistinct. However, particulars of the boundary layer can be revealed by mechanical measurements. Because the low-expanded foam layer, high-expanded foam layer, and boundary layer have the same composition and there is a correlation between specific gravity and hardness, the presence of the high-expanded foam layer, low-expanded foam layer, and boundary layer can be established by hardness measurements.

Figure 2:
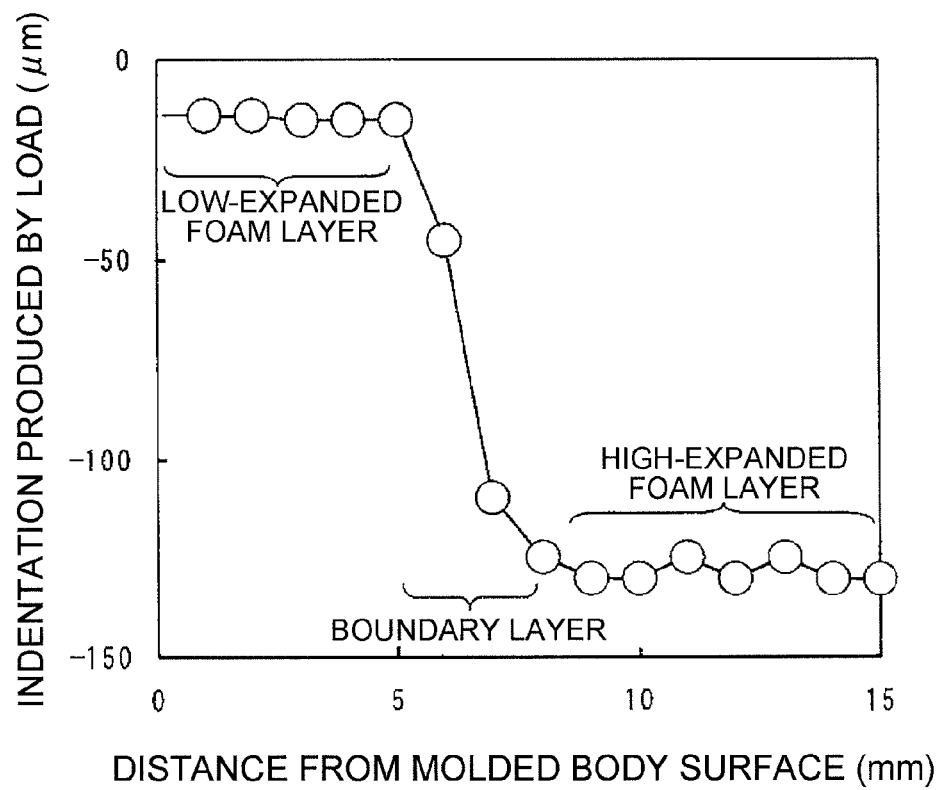
FIG. 2 shows an example of measuring hardness variations in the thickness direction of the woody resin molded body in accordance with the present invention.

FIG. 2 shows an example of measurement results. FIG. 2 is a hardness distribution diagram obtained by using a reciprocal frictional wear test apparatus and a surface roughness meter and performing measurements from the molded body center toward the outer peripheral portion in the thickness direction (30 mm) on the end surface perpendicular to the extrusion direction in a woody resin molded body of a low-expanded foam layer with a cross-sectional shape of 150 mm×30 mm. An indentation produced by the load of the reciprocal frictional wear test apparatus is plotted against the ordinate; the smaller is the absolute value of the numerical value of the indentation, the higher is the hardness, that is, the higher is the strength and specific gravity. The measurements illustrated by FIG. 2 were performed using the reciprocal frictional wear test apparatus and surface roughness meter, but any method may be used therefor, provided that the relationship between the hardness of the low-expanded foam layer and that of the high-expanded foam layer can be determined. For example, similar results can be obtained by using Rockwell hardness measurements and performing measurements at the end surface from the molded body center toward the outer peripheral portion.

The measurement method will be described below in greater detail. A pin (indenter) with a round distal end of the reciprocal frictional wear test apparatus applying a constant load is swept at a constant rate from the molded body center toward the side surface of the molded body accurately along the thickness direction on the end surface of the molded body. The sweeping is then reciprocated till the difference between the indentations in the high-expanded foam layer and low-expanded foam layer becomes large enough to be visually recognizable, and the depth of the groove that has been depressed by the sweeping is measured using the surface roughness meter at various distances from the surface layer. This groove depth is a measure of hardness.

As shown in FIG. 2, a region in which the groove depth has an almost constant small value, that is, the hardness is high, is present in the vicinity of the surface layer. The hardness, that is, strength, correlates with specific gravity, and this portion is defined as a low-expanded foam layer in the present description. Meanwhile, a portion where the groove depth demonstrates an almost constant high value, that is, a low-hardness region, is present in the central portion of the molded body. This portion is defined as a high-expanded foam layer in the present description. A region in which a drastic change in hardness has occurred is present between the low-expanded foam layer and high-expanded foam layer. This portion is the above-described transient region and defined as a boundary layer in the present description.

As described hereinabove, the woody resin molded body in accordance with the present invention has a structure in which the high-expanded foam layer is present inside the molded body and the low-expanded foam layer is distinctly present on the circumference of the high-expanded foam layer. Where only a lightweightness is required, then uniform high foaming may be ensured from the center to the outer periphery, as in the conventional products. Conversely, where only rigidity and strength are required, the entire molded body from the center to the outer periphery may be configured by a non-foamed body. However, in the woody resin molded body in accordance with the present invention, a high-level balance of lightweightness and rigidity-strength is attained by this specific structure.

It is preferred that the low-expanded foam layer and high-expanded foam layer of the woody resin molded body be uniformly foamed respectively, that is, have a uniform foaming ratio. The low-expanded foam layer and high-expanded foam layer have the same composition, and strength, hardness, specific gravity, and foaming ratio are correlated. This is why the expression "uniform foaming ratio" also means a uniform hardness. FIG. 2 distinctly demonstrates that the low-expanded foam layer and high-expanded foam layer have respective uniform hardness. Therefore, it means that each layer has a uniform foaming ratio. FIG. 2 assumes hardness as a standard, but it is also possible to measure a specific gravity or strength in each position by another measurement method and plot a similar graph by laying the measured value obtained by the measurement method against the ordinate.

The uniformity of foaming of the low-expanded foam layer or high-expanded foam layer, as referred to in the present description, means a uniformity of an order such that that the relationship between an average value A and a standard deviation σ of a measured value such as hardness, specific gravity, or strength in each layer is within a range represented by the following formula:

$$0 \leq \sigma/A \leq 0.25.$$

The standard deviation σ, as referred to herein, indicates the square root of invariant dispersion, rather than sample dispersion.

The measured value as referred to herein is a measured value of any one among hardness, specific gravity, and strength in various positions in the low-expanded foam layer or high-expanded foam layer, but not all the measurements are possible for some shapes, and there is a difference in measurement error between the measurement methods. For this reason, the σ/A range is defined as a value obtained by the method with the smallest measurement error from among the measurement methods that are suitable for the measurements.

From the standpoint of balance of lightweightness and rigidity-strength, a high degree of uniformity is desirable, and it is further preferred that the σ/A ratio be within the following range.

$$0 \leq \sigma/A \leq 0.10.$$

The high-expanded foam layer can include a certain number of portions with abnormal foaming, such as voids, but this practically does not affect the effect of the present invention. Therefore, during the aforementioned measurements, the measured values relating to these portions are excluded.

The boundary layer in which specific gravity changes drastically, as referred to in the present description, means a layer in which the specific gravity changes from a specific gravity Y of the high-expanded foam layer to a specific gravity X of the low-expanded foam layer over an extremely short distance in the thickness direction of the molded body from the molded body center toward the low-expanded foam layer surface. A drastic change in specific gravity also means, as described hereinabove, a drastic change in hardness, strength, and foaming ratio. By taking hardness as a measure, it is possible to represent the boundary layer with a graph such as shown in FIG. 2.

The boundary layer thickness in the thickness direction of the molded body, which is such an extremely short distance, depends on the molded body thickness, but the thickness of a boundary layer in a molded body of a size of a hypothetical exterior construction material, that is, a thickness of up to about 200 mm, is equal to or less than 15 mm. Therefore, a state in which the specific gravity Y of the high-expanded foam layer changed to the specific gravity X of the low-expanded foam layer within a distance of 15 mm or less in the thickness direction of the molded body is defined as a drastic change in the present description. The boundary layer thickness is preferably equal to or less than ⅕, more preferably equal to or less than 1/10 the molded body thickness.

The thickness of the woody resin molded body in accordance with the present invention is preferably equal to or greater than 10 mm, more preferably equal to or greater than 15 mm, and most preferably equal to or greater than 20 mm. This is because where the thickness is less than 10 mm, distinct formation of the low-expanded foam layer and high-expanded foam layer in molding is difficult from the standpoint of production technology. The upper limit of the thickness of the woody resin molded body, as referred to in the description of the present invention, theoretically does not exist, but because the increase in thickness enlarges the capacity of extrusion molding machine and requires the increase in a cooling die length, the production technology supposedly places a limit of about 200 mm.

In a case where the woody resin molded body has a rectangular cross-sectional shape, the thickness thereof, as referred to in the description of the present invention, indicates the shorter of the vertical length and transverse length. In a case of a cross-sectional shape that can be approximated by a rectangular shape, such as a shape having a groove in part of the rectangle, the shape is approximated by a rectangle and the thickness similarly indicates the shorter of the vertical length and transverse length. Where the cross-sectional shape is a circle, the thickness indicates a diameter, and where the cross-sectional shape is an ellipse, the thickness indicates a short diameter.

In a case where a foamed layer is sandwiched between two low-expanded foam layers in the thickness direction of the molded body, the thickness of the low-expanded foam layer in the present description indicates a thickness of either of the low-expanded foam layers.

Because the woody resin molded body in accordance with the present invention has the low-expanded foam layer and high-expanded foam layer, secondary processing such as nail driving, screw tightening, and saw cutting can be easily performed. A woody resin molded body that contains no high-expanded foam layer and has as a whole a strength and specific gravity similar to those of the low-expanded foam layer, has a high product strength, but because it is hard, secondary processability thereof is very poor. In accordance with the present invention, the high-expanded foam layer is provided that is lower in hardness than the low-expanded foam layer. As a result, secondary processing such as nail driving, screw tightening, and saw cutting can be easily performed. In other words, no comparatively large forces are required in manual processing, and in a case where operations are performed with electric tools, power consumption and heat generation in the processing zone can be inhibited and operability can be increased. In particular, in a case where operations are performed with rechargeable electric tools, reduction of power consumption decreases the frequency of battery replacement, thereby greatly contributing to operability improvement. Furthermore, the inhibition of heat generation reduces the melting of facets and decreases their attachment to the tools, thereby contributing to operability improvement as well.

Another effect produced by the presence of the high-expanded foam layer is that a heat capacity of the woody resin molded body itself is smaller than a heat capacity of a non-foamed resin molded body of the same volume. Thus, although it depends on the shape of irregularities of the molded body surface, color and place where the operation is performed, an effect of preventing a feeling of hot or cold surface of the exterior member that comes into contact with bare hands or feet at the height of summer or winter can be expected.

The presence of the low-expanded foam layer having a high strength and a high specific gravity contributes to maintaining a high retention force with respect to the driven screws or nails.

As mentioned hereinabove, the woody resin molded body in accordance with the present invention has the above-described specific structure. Therefore, the woody resin molded body has good secondary processability in addition to lightweightness and strength-rigidity and enables secondary processing similar to that of natural wood.

In the woody resin molded body in accordance with the present invention, the thickness of the low-expanded foam layer is preferably equal to or greater than 1 mm and equal to or less than $\frac{1}{3}$ the molded body thickness, and more preferably equal to or greater than 2 mm and equal to or less than $\frac{1}{4}$ the molded body thickness. In a case where the surface of the low-expanded foam layer is polished, it is preferred that the thickness of the low-expanded foam layer in the molded body after polishing be within the above-described ranges. Where the thickness of the low-expanded foam layer is equal to or greater than 1 mm, the woody resin molded body demonstrates sufficient rigidity and strength and also has a sufficient retention strength with respect to nails or screws driven thereinto. Where the thickness of the low-expanded foam layer is equal to or less than $\frac{1}{3}$ the thickness of the woody resin molded body, the molded body is light and has good secondary processability in nail or screw driving and saw cutting. Thus, from the standpoint of obtaining good secondary processability in addition to lightweightness and good rigidity and strength, it is preferred that the thickness of the low-expanded foam layer be within the above-descried range.

For the low-expanded foam layer to demonstrate good rigidity and strength and also good retention force with respect to nails and screws and for the high-expanded foam layer to demonstrate lightweightness and good cutting ability with a saw, it is preferred that the following relationships will satisfied at the same time:

$$0.1 \leq X-Y \leq 0.5,$$

$$0.80Z \leq X \leq 0.99Z,$$

$$0.50Z \leq Y \leq 0.85Z,$$

where X represents a specific gravity of the low-expanded foam layer, Y represents a specific gravity of the high-expanded foam layer, and Z represents a specific gravity of a non-foamed body of a woody resin composition wherein the non-foamed body has the same composition as the two foamed layers, although certain variations can be caused by the compounding ratio of cellulose powder and type of the resin used.

The foaming ratio Z/X of the low-expanded foam layer and the foaming ratio Z/Y of the high-expanded foam layer are preferably within the following respective ranges.

$$1.01 \leq Z/X \leq 1.25,$$

$$1.18 \leq Z/Y \leq 2.00.$$

The non-foamed body of a woody resin composition of the same composition, as referred to hereinabove, means in the present description a woody resin composition of the same composition as the low-expanded foam layer and high-expanded foam layer, without the blowing agent. More specifically, the non-foamed body is an injection molded article of the same composition from which the blowing agent has been removed. In a specific method for calculating the specific gravity Z of the non-foamed body, a 10 mm×4 mm×80 mm ISO rectangular sample die is used in injection molding, molding is performed, while gradually raising the maintained pressure, the weight of the molded article is increased, and the specific gravity of the molded article is measured when the weight of the molded article reaches a saturation state.

Furthermore, a method for measuring the specific gravity X of the low-expanded foam layer and the specific gravity Y of the high-expanded foam layer as referred to in the present description is a method by which sample bodies of a rectangular shape with a thickness of about 1 mm to 2 mm are accurately cut out with a precision cutting saw from corresponding portions of the woody resin molded body, the sample bodies are conditioned under an environment with an air temperature of 23° C. and a humidity of 50%, dimensions are measured with a micrometer and a weight is measured with a precision electronic balance under the same environment, and calculations are performed. The cutting position of the aforementioned corresponding portions can be accurately determined by using preceding hardness measurements.

[2] Woody Resin Polished Body

The woody resin molded body in accordance with the present invention has a surface of the low-expanded foam layer where the cellulose powder is not exposed. A woody resin polished body can be obtained by polishing this surface and obtaining a surface on which the cellulose powder is exposed. The polishing improves a natural wood feel and also increases coatability. The surface polishing may be performed over all the surfaces of the molded body or only on one surface, for example, a aesthetic surface. When a plurality of surfaces are polished, each surface may be polished to a different degree.

[3] Method for Manufacturing the Woody Resin Molded Body

The woody resin molded body in accordance with the present invention can be manufactured by integral profile foaming and extrusion molding by using a shaping die having no core body. The term "integrally" as used herein means that the low-expanded foam layer and high-expanded foam layer are molded simultaneously, rather than separately, and then combined together. The woody resin molded body obtained by such a manufacturing method has no interfaces or weld lines of the conventional articles. Therefore, defects caused by interfaces or weld lines, that is, decrease in strength caused by disaggregation, penetration of water to the disaggregated portions, retention of dust therein, and occurrence of mold, do not occur.

Methods for obtaining a state in which the outer side of the molded body has a high specific gravity and the inner side has a low specific gravity by foam molding in a die using a core body is disclosed in Patent Documents 1 and 2. In principle, a fixing member that fixes the core body to the inner wall of the die divides a molten resin channel and inevitably creates weld lines. In particular, where weld lines are present in a case of a molded body comprising a vegetable cellulose powder, the weld lines tend to be unintentionally conspicuous due to a colorant component from the cellulose powder. This is, however, not a concern in woody resin molded bodies having no weld lines. Furthermore, the molded body described in Patent Document 1 has a linear distribution of specific gravity from the center to the outer side of the molded body and is, therefore, different from the woody resin molded body in accordance with the present invention that has the low-expanded foam layer and high-expanded foam layer.

In some cases the weld lines or interfaces can be visually recognized, but they can be also reliably recognized by facture surface observations performed when measuring the bending strength. Where weld lines or interfaces are present when a bending strength test is performed, the respective portion is disaggregated easier than other portions. Therefore, cracks easily run along the weld lines or interfaces. As a result, traces are easily developed. For example, a method stipulated by JIS K6931 can be used as the bending strength test.

In the method for manufacturing the woody resin molded body in accordance with the present invention, manufacturing conditions are selected such that the barrel temperature of the extrusion molding machine is set lower than the foaming temperature of the blowing agent, but the shaping die temperature is set within the foaming temperature range of the blowing agent. As a result, the woody resin composition is plasticized, but not foamed, inside the barrel, and foaming occurs in a concentrated manner in the cooling die disposed at a subsequent stage after the shaping die. Causing the foaming in a concentrated manner in the cooling die plays an important role in forming the high-expanded foam layer, boundary layer, and low-expanded foam layer.

A mechanism of forming the high-expanded foam layer and low-expanded foam layer is assumed to be as follows. Thus, in the cooling die, the molten woody resin composition is pushed out by a high foaming pressure from the central portion of the molded body toward the inner wall of the cooling die located on the outer side. The molten woody resin composition that has been pushed out to the vicinity of the inner wall of the cooling die loses heat and starts solidifying. Even if the unreacted blowing agent is present herein, no foaming can occur. By contrast, because the central portion of the molded body is not cooled significantly, foaming continues for a longer time than in the outer peripheral portion of the molded body that is in contact with the inner wall of the cooling die, and the molten woody resin composition is continuously supplied toward the outer peripheral portion. As a result, the central portion assumes a highly foamed state, whereas in the surrounding region, a layer in a lowly foamed state is formed. The structure of the woody resin molded body having the high-expanded foam layer and low-expanded foam layer is formed in the cooling die.

The method for manufacturing a woody resin molded body in which foaming is induced in the cooling die is different from the usual foam and extrusion molding method in which the foaming reaction of the blowing agent is completed in the barrel of the extrusion molding machine and in the shaping die and then the molten resin composition is extruded into the cooling die.

Furthermore, in order to perform molding such that no cellulose powder is exposed on the surface of the low-expanded foam layer, for example, the temperature of the barrel of the extrusion molding machine may be set lower than the foaming temperature of the blowing agent contained in the woody resin composition and the shaping die temperature may be set within the foaming temperature range of the blowing agent, thereby causing foaming inside the cooling mold. Molding conditions required to satisfy these requirements can be attained by optimizing temperature settings of the extrusion molding machine, screw rotation speed, supply rate of starting materials, temperature settings of the profile extrusion die, pick-up rate of a pick-up machine, type and amount added of the blowing agent, type of coating agent on the inner surface of the cooling die, and length of the cooling die. The molding is preferably conducted under conditions such that an outer shape of the molded body discharged from the cooling die becomes larger than an outlet port shape of the cooling die. Where molding is performed under such conditions, the low-expanded foam layer of the outer peripheral portion of the molded body that is formed by as a result of pushing out to the inner wall of the cooling die has an increased specific gravity and enlarged thickness, whereas the high-expanded foam layer of the central portion has decreased specific gravity. The resultant effect is that a balance of mechanical properties, lightweightness, and secondary processability of the molded body is improved. In typical foam and extrusion molding, the molded shape is directly that of the commercial product. As a result, the dimensions have to be stringently controlled during molding. For this reason the above-described molding conditions under which the shape obtained is larger than the outlet port shape of the cooling die and which cause a spread in dimensions are usually not selected. By contrast, in the manufacturing method in accordance with the present invention, polishing is performed after the foam and extrusion molding and the dimensions can be controlled by polishing. Therefore, the aforementioned molding conditions can be advantageously used. This feature is a great merit of the manufacturing method in accordance with the present invention. The polishing process itself also uses the merit of "polishing ability" inherent to the woody resin composition in accordance with the present invention. With other typical resin composition, polishing is usually accompanied by cracking and fusion of polishing chips to the polishing machine that cause inconveniences. As a result, the polishing process is usually not easy to use.

From the standpoint of preventing the external appearance defects and decrease in strength, it is preferred that sufficient sliding ability be ensured between the woody resin composition pushed against the cooling die and the inner wall of the cooling die. By ensuring sliding ability between the woody resin composition pushed against the cooling die and the inner wall of the cooling die, it is possible to prevent a friction force generated therebetween from being too high and acting inside the cooling die and also to prevent the occurrence of hair cracks at the molded body surface due to insufficient sliding ability.

The sliding ability can be advantageously ensured when a thermoplastic resin constituting the woody resin composition has a composition including a lubricant. Specific examples of the lubricant include polyethylene for molding, polyethylene wax, polypropylene wax, paraffin wax, and an ultrahigh molecular weight polyethylene. One or a plurality of these materials may be used. The polyethylene for molding, as referred to herein, is polyethylene that is used as a molding starting material for typical molding such as injection molding, compression molding, extrusion molding, and blow molding, and a copolymer of ethylene and a comonomer component such as HDPE, LDPE, LLDPE, propylene, and vinyl acetate. These compounds are included in a range of thermoplastic resin that is a component constituting the woody resin composition, and the compounded amount thereof is calculated as a compounded amount of the thermoplastic resin.

In a case where only polyethylene for molding is used without using other lubricant, in order to obtain sufficient sliding ability, it is preferred that the compounding ratio of the polyethylene for molding be equal to or higher than 15 wt. % of the entire woody resin composition. The upper limit may be raised to 80 wt. %, which is the maximum compounding ratio of the thermoplastic resin. Polyethylene alone can be used as the thermoplastic resin, but using a high-rigidity resin such as polypropylene and polystyrene in combination with polyethylene is more advantageous as means for further increasing the rigidity or strength of the woody resin composition while maintaining sufficient sliding ability with the inner wall of the cooling die.

In a case where the lubricant is polyethylene wax, polypropylene wax, paraffin wax, or an ultrahigh molecular weight polyethylene, from the standpoint of obtaining sufficient sliding ability, it is preferred that the total amount thereof be equal to or greater than 1 wt. %, more preferably equal to or greater than 4 wt. % of the total woody resin composition. From the standpoint of preventing cost increase and degradation of physical properties, the amount used is preferably equal to or less than 10 wt. % and more preferably equal to or less than 6 wt. %.

Providing a lubricating means on the inner surface of the cooling die is also advantageous as a second means for ensuring sliding ability. Low-friction processing by fluororesin coating (TEFLON (trademark) coating or the like), chromium plating, and buffing is advantageous as a method of the lubricating means.

It is preferred that the surface roughness of the inner surface of the cooling die be low. More specifically, in a case where the surface roughness is measured with a surface roughness meter according to JIS B0601-1994, it is preferred that the arithmetic average roughness Ra be equal to or less than 0.5 µm, more preferably equal to or less than 0.3 am, and even more preferably equal to or less than 0.1 µm.

Providing a lubricating means on the inner surface of the shaping die is also advantageous because it tends to stabilize the molding process.

In a case where a cross section perpendicular to the extrusion direction of the woody resin molded body has a polygonal shape (tetragonal or the like), a method for performing a corner R and/or a C surface processing in the corner portions where two adjacent inner wall surfaces of the cooling die are formed is advantageous as a third means for ensuring the sliding ability. This is because the corner portions inside the cooling die are the locations where the surface of the molten and/or solidified woody resin composition coming into contact therewith receive the largest resistance and are easily caught. Furthermore, in the molded body itself, these portions are the easiest for hair cracks to occur. The risk of hair cracking can be reliably reduced by performing the corner R and/or C surface processing in all the corner portions or some of them. More specifically, in a case of corner R, the preferred radius is equal to or greater than 0.5 mm. The upper limit is preferably as large as allowed by aesthetic properties and functionality of the molded body, but if it is too high, the cross-sectional shape easily becomes elliptical. Therefore, in a case of an angular material with a thickness and width of equal to or greater than 20 mm, a radius of up to about 5 mm is suitable for practical use. As for a C surface, at an angle of 45°, the size range of the same order as that relating to the corner R is preferred.

The woody resin molded body molded with the cooling die subjected to such a corner R and/or C surface processing has a cross-sectional shape obtained by transferring the shape of the corner R and/or C surface. The transferred corner R and/or C surface may remain, provided that it does not affect aesthetic properties. In a case where the corner R or C surface is small, it may be removed by machining. The surface of portions of the corner R or C surface can be also removed with a trimmer or a plane.

A method of introducing a lubricant into the thermoplastic resin constituting the woody resin composition, a method of providing a lubricating means on the inner wall surface of the cooling die, and a method of performing a corner R and/or C surface processing on the corner portions of the cooling die may be employed individually or in combinations of two thereof to ensure sliding ability.

Where the sliding ability between the woody resin composition and the inner wall of the cooling die has been ensured, it is possible to select molding conditions under which the foam pressure inside the cooling die is further increased. Where the foam pressure inside the cooling die is further increased, a larger amount of the molten woody resin composition is pushed out to the outer peripheral portion inside the cooling die. As a result, the low-expanded foam layer is formed to a larger thickness and a high specific gravity. Furthermore, the high-expanded foam layer can be foamed to an accordingly higher degree and can be in a state with an accordingly low specific gravity.

In order to form the low-expanded foam layer having a sufficient strength around the high-expanded foam layer, as described hereinabove, molding conditions are desirable such that the surface of the molded body is pushed out by a foam pressure from inside and the molten resin is gradually pushed out by foaming from the central portion of the resin composition toward the inner wall surface of the die.

The preferred temperature settings of the molding machine cylinder and shaping die are described below. The highest temperature inside the shaping die is set within the foaming temperature range of the blowing agent, and the barrel temperature of the extrusion molding machine is set lower than the foaming temperature of the blowing agent. Thus, temperature settings such that foaming proceeds in a concentrated manner from inside the shaping die to the cooling die, are necessary for the method for manufacturing the woody resin molded body in accordance with the present invention.

Figure 3:
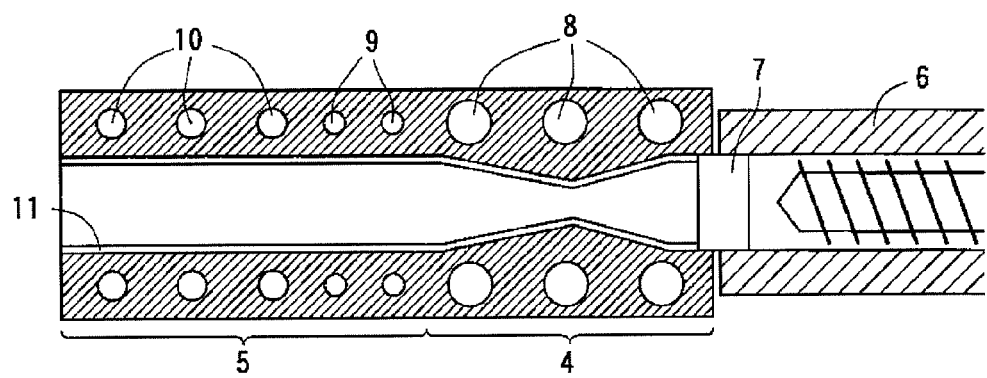
FIG. 3 is a schematic cross-sectional view illustrating an example of a profile extrusion die for use in the method for molding the woody resin molded body in accordance with the present invention.

FIG. 3 is a schematic cross-sectional view illustrating an example of the shaping die and cooling die for use in the manufacturing method in accordance with the present invention. In the figure, the reference numeral 4 represents a shaping die, 5 represents a cooling die, 6 represents a barrel of extrusion molding machine, 7 represents a breaker plate, 8 represents a heater, 9 represents an air piping for air cooling the cooling die 5, 10 represents a piping for water cooling the cooling die 5, and 11 represents a low-friction processed layer on the inner wall of the die.

The shaping die 4 has a release-compression-release structure in which the cross section area in the extrusion direction of the woody resin composition decreases immediately after the woody resin composition has been extruded from the barrel of the extrusion molding machine and then again increases. The heater 8 is designed to heat the woody resin composition flowing though the shaping die 4 to a foaming temperature of the blowing agent contained in the woody resin composition.

The resin composition that has entered the shaping die 4 from the barrel 6 of the extrusion molding machine is released after compression inside the shaping die 4, thereby decreasing the internal pressure. As a result, the resin composition enters the cooling die 5, while the blowing agent is efficiently foamed, and the surface of the woody resin composition is pressed against the inner wall of the cooling die 5. Because the low-friction processed layer 11 is provided on the inner wall, the woody resin composition can slide inside the cooling die 5, without encountering a high resistance. The cooling die 5 is cooled by cooling water flowing in the piping 10 for water cooling, and the vicinity of the surface of the woody resin composition sliding inside the cooling die is also cooled. By contrast, the vicinity of the central portion of the woody resin composition still retains the foaming temperature inside the cooling die 5 and foaming occurs even when the woody resin composition slides inside the cooling die 5. Such continuation of local foaming inside the cooling die 5 apparently contributes to the formation of the woody resin molded body having a high-expanded foam layer and a low-expanded foam layer formed on the outside of the high-expanded foam layer.

It is possible not to use the breaker plate 7, but using it can easily stabilize the molding process. When the breaker plate 7 is used, the fluid molten resin composition in principle has weld lines immediately after it passes the breaker plate 7. However, in the configuration shown in FIG. 3, because the flow reaches a large open space immediately after the breaker plate 7, the flow becomes turbulent. In addition, the resin is compressed when passing through a channel of the release-compression-release structure of the shaping die 4. Therefore, weld lines originating from the breaker plate 7 are eliminated. Furthermore, the weld lines in the portion corresponding to the outer peripheral portion of the molded body are easily eliminated because the fluid woody resin composition is heated to a foaming temperature range of the blowing agent by the heater 8 in the shaping die 4. In a case of a thick shape such that the molded body thickness exceeds 40 mm, some traces, that is, weld lines of the breaker plate 7, can remain in the central portion of the molded body, but this is not a problem because even when color unevenness or water penetration caused by the weld lines occur in the central portion of the molded body, they produce no effect on aesthetic properties or rigidity-strength of the product.

The thermoplastic resin constituting the woody resin composition used in accordance with the present invention is not particularly limited, but from the standpoint of secondary processability, a thermoplastic resin including one or more from among polyethylene, polypropylene, and polystyrene is preferred. Furthermore, from the standpoint of secondary processability, strength, and rigidity, a thermoplastic resin is preferably used that is composed of a mixture of at least polyethylene and polystyrene or polypropylene.

The woody resin composition includes a cellulose powder that is generally easily affected by thermal decomposition. Therefor, a thermoplastic resin that can be processed at a comparatively low temperature is preferred. From the standpoint of preventing the generation of decomposition gas occurring during extrusion molding, it is preferred that extrusion molding be carried out at a temperature of equal to or lower than 200° C., more preferably equal to or lower than 190° C., and most preferably equal to or lower than 180° C. Therefore, polyethylene, polystyrene, and polypropylene are highly advantageous as the thermoplastic resin.

HDPE, LDPE, and L-LDPE may be used as the polyethylene, but HDPE is preferred because an excellent mechanical strength can be obtained. As for flowability, a melt index range preferably of 0.01 to 10.0 and most preferably of 0.05 to 5.0 has a great advantage in terms of molding. The melt index as referred to herein is specified by JIS K6922, Code D, and is a value obtained at a measurement temperature of 190° C. and a load of 2.16 kg.

General purpose polystyrene (GPPS), which is obtained by homopolymerization of styrene, and high-impact polystyrene (HIPS), which is a copolymer of a conjugated diene and styrene, can be advantageously used as the polystyrene. Among them, GPPS is preferred because of a high rigidity thereof. As for flowability, a melt index range preferably of 0.1 to 20.0 and most preferably of 0.5 to 10.0 has a great advantage in terms of molding. The melt index as referred to herein is specified by JIS K6923, Code H, and is a value obtained at a measurement temperature of 200° C. and a load of 5.00 kg.

General purpose polypropylene (PP) and random copolymers or block copolymers that are copolymers of propylene and other monomers can be advantageously used as the polypropylene. Furthermore, polypropylene modified with an acid anhydride can be also used. A block copolymer or random copolymer that can be processed at a comparatively low temperature is preferred as the polypropylene. As for flowability, a melt index range preferably of 0.1 to 20.0 and most preferably of 0.5 to 10.0 has a great advantage in terms of molding. The melt index as referred to herein is specified by JIS K6921-1, Code M, and is a value obtained at a measurement temperature of 230° C. and a load of 2.16 kg.

The thermoplastic resin may be a blend of two or more resins from among polyethylene, polystyrene, and polypropylene. In this case, a compatibility-improving agent can be used to improve compatibility of the blended resins. For example, in a case where polyethylene or polypropylene is blended with polystyrene, a hydrogenated styrene elastomer is preferably compounded as the compatibility-improving agent. For example, it is preferred that Tuftec H1041, H1043, and H1051 produced by Asahi Chemical Industry Co., Ltd. be compounded.

The cellulose powder is not particularly limited. Examples of suitable cellulose powder include wood chips, wood pellets, pulp, bagasse, kenaf, sawdust, wood fibers, chaff, crushed wood chips, fruit hull powder, old paper, bamboo powder, beer draff, coffee draff, ground powder of nonwoven fabrics, cotton, cotton yarns, and rayon fibers, and these can be used individually or in combinations of two or more thereof. The cellulose powder can be appropriately selected according to application, but from the standpoint of mechanical strength and secondary processability, wood powder and wood pellets are preferred.

If necessary, the cellulose powder can be subjected to dry or wet grinding, and a powder that is obtained, if necessary, by means of sifter to a particle size of 0.1 mm to 10 mm is preferred. In a case where the particle size of cellulose powder is below the aforementioned range, the powder can easily become airborne during handling thereof. Furthermore, grinding and classifying become troublesome and cost rises. Where the particle size is above the aforementioned range, the mechanical strength of the obtained molded body can be insufficient.

The cellulose powder can have not only a grainy shape, but also a flat shape, irregular shape, or may be a mixture including particles of these shapes.

The woody resin composition is a mixture of at least the thermoplastic resin and the cellulose powder, and the mixing ratio thereof (weight ratio) is 20/80 to 80/20. The weight ratio of the thermoplastic resin in the mixture of the thermoplastic resin to the cellulose powder is preferably 25 to 70 wt. %, more preferably 30 to 50 wt. %. Where the ratio of the thermoplastic resin in the mixture is less than 20 wt. %, problems are associated with processability, and when the ratio is higher than 80 wt. %, the molded body has the so-called plastic-like appearance and woody feel is lost.

It is preferred that a blowing agent is added to the woody resin composition in order to induce foaming of the foaming components inside the cooling die with good stability and reliability. Commercial blowing agents can be used. Blowing agents preferably have a lower limit of the foaming temperature range of 140° C. to 200° C., more preferably 160° C. to 190° C., although this range is somewhat affected by the type of the thermoplastic resin contained in the woody resin composition. The foaming temperature has to be equal to or higher than 140° C. in order to be equal to or higher than the molding temperature of the woody resin composition. At the same time, the foaming temperature is preferably equal to or lower than 200° C. to prevent the cellulose powder from decomposition that creates scorching during molding. Either an inorganic agent or an organic agent can be advantageously used, provided that the foaming temperature is within the aforementioned range. The blowing agent is used within a range of 0.2 part by weight to 3.0 parts by weight per 100 parts by weight of the mixture of the thermoplastic resin and cellulose powder.

As described hereinabove, polyethylene is preferably compounded with the thermoplastic resin in order to impart lubrication ability to the woody resin composition. Furthermore, polyethylene is a cracking-resistant resin and advantageous as a starting material for a woody resin molded body for supposed applications involving nail and screw driving. However, from the standpoint of satisfying requirements relating to rigidity or strength, it is preferred that the thermoplastic resin be a mixture of polyethylene with polystyrene and/or polypropylene, rather than polyethylene alone.

From the standpoint of resolving environmental problems and reducing production cost, it is preferred that wastes be used as at least part of starting materials for the thermoplastic resin and/or cellulose powder.

If necessary, other additives and fillers may be added to the woody resin composition within a range in which the effect of the present invention is not lost.

Examples of the agent improving compatibility of the thermoplastic resin and cellulose powder include polyolefin resins having an anhydrous carboxylic acid group or acrylic acid group as a functional group, or maleic anhydride, glycidyl acrylate, and glycidyl methacrylate.

Examples of other suitable additives include colorants, lubricating agents, stabilizers, UV absorbers, antioxidants, and antistatic agents.

Examples of suitable fillers include powdered inorganic fillers such as talc and calcium carbonate, inorganic fiber-like fillers such as glass fibers, and organic fiber-like fillers such as polyester fibers.

It is preferred that the cellulose powder be individually dried, or that the thermoplastic resin component, cellulose powder component, and other necessary components be heated, mixed, and dehumidified using a Banbury mixer or Henschel mixer before the woody resin composition is prepared. Implementing such a pre-treatment is especially desirable when a wood powder with a high moisture content is used.

A drier for powders such as a hopper dryer and a paddle drier can be used as means for drying the cellulose powder independently. Furthermore, using a Henschel mixer, a Schuller mixer, a ribbon blender, or a paddle drier and drying under normal or reduced pressure conditions can be used as means for drying the cellulose powder in a state of mixing with other components. In case where the cellulose powder is mixed with other components and dried prior to extrusion molding, it is preferred that aggregation of the components be inhibited.

Dewatering and drying treatment can be also advantageously applied as means for drying the cellulose powder by degassing under normal or reduced pressure conditions from a cylinder vent port of the extrusion machine during extrusion molding.

Where heating is performed till the contents introduced in the Banbury mixer or Henschel mixer assumes a high-viscosity molten state, a torque-over can occur in the mixer and a state can be assumed in which subsequent stirring is impossible. Therefore, the upper limit of processing temperature in the mixer is preferably equal to or less than 200° C., more preferably equal to or less than 180° C.

[4] Method for Manufacturing Woody Resin Polished Body

The surface of the low-expanded foam layer of the woody resin molded body in accordance with the present invention can be advantageously polished using a plane or a sander. An automatic planning machine or a belt sander that is typically used for processing angular materials from natural wood can be used especially advantageously because the polishing amount can be easily controlled and because the process is suitable for industrial mass production. A belt sander is more preferred for final finishing of the polishing process because such sander imparts stripe-like irregularities in the polishing direction, thereby further increasing a woody feel. In a case where the polishing amount is small, polishing with the belt sander alone is preferred for industrial production, and when the polishing amount is large, a method by which polishing is performed with an automatic plane to an intermediate stage and then a belt sander is used is preferred from the standpoint of industrial production. The woody resin polished body obtained by such polishing has feel close to that of natural wood, that is, a woody feel, and also high coatability.

The polishing amount of the low-expanded foam layer required to obtain the woody resin polished body is preferably equal to or greater than 0.3 mm and equal to or less than 5 mm, more preferably equal to or greater than 1 mm and equal to or less than 3 mm per one surface. By performing polishing in an amount of equal to or greater than 0.3 mm, the cellulose powder is exposed, a woody feel is created, and the surface can be easily coated. From the standpoint of preventing unnecessary polishing amount and polishing time, it is preferred that the polishing amount be equal to or less than 5 mm.

Why the woody feel is created and coatability is improved by polishing the surface of the low-expanded foam layer is not exactly clear. The inventors presume the following. Under molding conditions that cause the formation of the low-expanded foam layer that has a high specific gravity around the high-expanded foam layer, the surface of the molded body inside the cooling die smoothly moves along the contact surface with the cooling die, without splitting or tearing, the cellulose powder that is present on the surface of the low-expanded foam layer in this process sinks into the low-expanded foam layer and a state is assumed in which the surface contains practically only the resin component, without the cellulose powder. This trend apparently becomes particularly prominent in a case where sliding ability is ensured between the woody resin composition and the inner wall of the cooling die. For this reason, the surface of the low-expanded foam layer of the woody resin molded body that exits the cooling die is in a mirror surface state in which it is covered with the resin and no cellulose powder is exposed therein. As a result, the molded body has a plastic-like external appearance.

By contrast, by polishing the surface composed almost only of the resin component, it is apparently possible to expose the cellulose powder that has sunk internally. The surface composed only of the resin component has poor affinity for paints in most cases, while the cellulose powder has no such problem. Therefore, polishing has been assumed to improve coatability. In particular, in a case where a polyolefin resin such as polyethylene and polypropylene is used for the entire thermoplastic resin constituting the woody resin composition or part of the resin, polishing the surface to be coated is especially preferred because the polyolefin resins have poor affinity for paints and are difficult to coat.

The wood resin molded body and wood resin polished body in accordance with the present invention are building materials mainly assumed for use as exterior materials receiving a load, such as deck floors and steps and fence poles and crest tables. For this reason, the value of flexural modulus is preferably equal to or greater than 2,000 MPa (in such a case, deflection is small), and more preferably equal to or greater than 2,300 MPa. The flexural modulus is a value measured according to JIS K6931.

Tests carried out by the inventors demonstrated that the flexural modulus tends to increase when foaming during molding is inhibited and specific gravity of the entire molded body is increased. Comparison with samples of the same composition and shape demonstrated that this trend is almost linear within a specific gravity range of 0.7 to 1.2. However, where specific gravity increases excessively, secondary processability such as nail driving, screw tightening, and saw cutting is remarkably degraded. With consideration for secondary processability, it is preferred that specific gravity be equal to or less than 1.0, more preferably equal to or less than 0.95, and especially preferably equal to or less than 0.93. With consideration for a balance of rigidity and secondary processability, a value obtained by dividing the flexural modulus by specific gravity is preferably equal to or greater than 2,100 MPa, more preferably equal to or greater than 2,300 MPa, and most preferably equal to or greater than 2,500 MPa.

In order to maintain sufficient rigidity even in outdoor use in summer time, it is preferred that woody resin molded body and woody resin polished body in accordance with the present invention have a high load deflection temperature of the woody resin composition constituting the bodies. More specifically, a value of the load deflection temperature measured according to JIS K7191-1, 2 is preferably equal to or higher than 75° C., more preferably equal to or higher than 80° C., and most preferably equal to or higher than 85° C.

EXAMPLES

The present invention will be specifically described hereinbelow based on examples thereof, but the present invention is not limited to these examples.

[Starting Materials]

The following starting materials were used in the examples.

<Thermoplastic Resins>

Polypropylene (PP): PB222A, manufactured by SunAllomer Ltd.

High-density polyethylene (HDPE): Suntec HD B871, manufactured by Asahi Chemical Industry Co., Ltd. (also corresponds to polyethylene for molding that is a lubricant).

Polystyrene (PS): PSJ-Polystyrene 680, manufactured by PS Japan Corp.

<Lubricant>

Ultrahigh-molecular weight polyethylene (UHMWPE): Sunfine UH-950, manufactured by Asahi Chemical Industry Co., Ltd.

Polyethylene wax (PE-WAX): Hiwax 200P, manufactured by Mitsui Chemicals Inc.

Paraffin wax: paraffin WAX 135, manufactured by Nippon Seiro Co., Ltd.

<Cellulose Powder>

Commercial wood powder (wood: pine): LIGNOCEL S150TR, manufactured by J. RETTENMAIER & SOHNE GmbH & Co.

Waste wood powder: compressed reduced-volume product from polishing dust of pencil wood portions discharged from a pencil production process.

<Compatibility-Improving Agent>

PP homopolymer modified with maleic anhydride: Polybond 3200, manufactured by UNIROYAL CHEMICAL Co.

<Blowing Agent>

Inorganic blowing agent master batch (carbonate-based): Cellmic MB 3064, manufactured by Sankyo Kasei Co., Ltd. (foaming temperature; 180-220° C.).

[Measurements]

<Hardness and Thickness of Low-Expanded Foam Layer, Boundary Layer, and High-Expanded Foam Layer>

The woody resin molded body was cut in the direction perpendicular to the extrusion direction, and measurements of hardness and thickness of the low-expanded foam layer, boundary layer, and high-expanded foam layer in the surface obtained were conducted by a method using a reciprocal frictional wear test apparatus and a surface roughness meter. In the reciprocal frictional wear test apparatus, a pin (indenter) was made from stainless steel and had a semispherical tip shape with a diameter of 5 mm. The contact load applied to the pin was 39.2 N (4 kgf), the sweeping rate of the pin was 30 mm/sec, and the number of reciprocal movement cycles was 30. AFT-15MS manufactured by Tosoku Seimitsu Kogyo KK was used as the reciprocal frictional wear test apparatus, and Surfeom 575A-3D manufacture by Tokyo Seimitsu KK was used as the surface roughness meter.

<Specific Gravity of Low-Expanded Foam Layer, High-Expanded Foam Layer, and Non-Foamed Body>

Based on the information obtained in thickness measurements of the low-expanded foam layer described in the previous section, samples having a rectangular shape and a thickness of about 2 mm were accurately cut out from a portion that belonged to the low-expanded foam layer and a portion that belonged to the high-expanded foam layer, the samples were conditioned at an air temperature of 23° C. to a humidity of 50%, then dimensions were measured with a micrometer, a weight was measured with a precision electronic balance under the same environment, and specific gravity of each sample was calculated.

The non-foamed body was obtained by molding an injection molded product of the woody resin composition from which the blowing agent has been removed. More specifically, a 10 mm×4 mm×80 mm ISO rectangular sample die was used, molding was performed, while gradually raising the maintained pressure, the weight of the molded article was increased, and the specific gravity of the molded article was measured when the weight of the molded article reached a saturation state. The measurements were performed in the same manner on the low-expanded foam layer and the high-expanded foam layer.

[Method for Evaluating Effect of the Invention]
<Lightweightness>

The molded body was accurately cut to a length of 100 mm, the width, thickness, length, and weight were accurately measured using a micrometer, and specific gravity was calculated.

<Rigidity•Strength>

Flexural modulus and bending strength were measured according to JIS K6931.

<Foaming Uniformity of High-Expanded Foam Layer and Low-Expanded Foam Layer>

Where the relationship between the average value A of the measured values of hardness of the high-expanded foam layer and low-expanded foam layer and standard deviation σ is within the below described range, the foaming was considered and confirmed to be uniform, where the relationship exceeded the range, the foaming was considered and confirmed to be nonuniform.

$$0 \leq \sigma/A \leq 0.25$$

<Easiness of Nail Driving>

Commercial nails for wood having a length of 45 mm were used and evaluation was performed by driving the nails into the polished surface of the molded body with a hammer. The evaluation was performed five times with different nails on one sample. A case where three or more of five nails could be driven in the same manner as in natural wood was evaluated as "No problem". A case where three or more nails stuck or bent, or the sample cracked was evaluated as "Hard and driving is difficult".

<Easiness of Screw Driving>

Commercial wood screws for wood having a length of 50 mm were used and evaluation was performed by driving the screws into the polished surface of the molded body with a driver. The evaluation was performed five times on one sample with different screws. A case where three or more of five nails could be driven in the same manner as in natural wood was evaluated as "No problem". A case where three or more screws could not penetrate or bent, or the sample cracked was evaluated as "Hard and driving is difficult".

<Weld Lines in Low-Expanded Foam Layer>

The polished surface of the molded body was visually evaluated and where weld lines were observed therein, the evaluation was "Weld lines are present". Even when no weld lines were visually observed, the evaluation was "Weld lines are present" in a case where the fracture surface of the sample after the previously conducted test aimed at the evaluation of rigidity and strength was observed, cracking of the low-expanded foam layer was not uniform, faults were observed, and they originated in the same position in a plurality of sample bodies of the same composition. In other cases the evaluation was "Weld lines are not present".

<Wood Feel>

Whether the wood feel has increased after polishing of the molded body surface was verified by the following method by comparing the surface state before and after the polishing.

Three persons visually checked the surface state before and after polishing. Where two or more of them determined that the aesthetic properties of natural wood feel have improved, the evaluation was "Improved". In other cases, the evaluation was "Not improved".

<Coatability>

Whether or not coatability after polishing has improved over that before polishing was verified by the following method with respect to a molded body that has been subjected to surface polishing, in the same manner as in the evaluation of wood feel.

The surface prior to polishing was brush-coated with the below-described commercial paints of three kinds in order to check coatability. The surface was then polished and the coatability of the polished portion was verified in the same manner. Where the polishing reduced paint peeling and facilitated coating, the coatability was evaluated as "Improved". In other cases the evaluation was "Not improved".

(1) Aqueous woody guard protective paint for wood (alkyd, acrylic series) manufactured by Nippe Home Products Co., Ltd., walnut color.

(2) Sunday Paint, aqueous glossy urethane series for construction objects, manufactured by Dainippon Paint Co., Ltd., brown color.

(3) Aqueous paint (acrylic, fluorine-containing) Hanzu Select, manufactured by Asahipen Corp, brown color.

Example 1

As a pretreatment, starting materials shown in Table 1, except the blowing agent, were charged in the compounding amounts shown in Table 1 into a Henschel mixer with a capacity of 500 L (manufactured by Mitsui Kosan KK), and the starting materials were stirred and then heating stir was conducted with shear heat generation. The heating was continued till the measured temperature of the thermocouple-type thermometer disposed inside the mixer raised close to about 130° C. and moisture contained in the cellulose powder was removed.

The stirring under heating induced by shear heat generation was then continued till the resin was softened and the cellulose powder started adhering to small lumps of the molten resin. The period in which the resin was softened and the cellulose powder started adhering to the circumference thereof was determined by stopping the Henschel mixer once when the value indicated by the mixer ammeter started changing, while observing the state of the pretreated mixture, and visually confirming the adhesion.

The obtained pretreated mixture was then transferred to a cooling mixer and cooled under stirring to a temperature equal to or less than 60° C. Once the temperature became 60° C., the blowing agent was charged into the cooling mixer in a compounding amount shown in Table 1 and then was stirred together with the cooled pretreated mixture.

The blended mixture thus obtained was used as a starting material for extrusion molding. A profile extrusion die (die A) shown schematically in FIG. 3 and having a cross-sectional shape of 156 mm×32 mm was attached to a twin-screw extruder PCM65 (manufactured by Ikegai Tekko KK), the above-described starting material for extrusion molding was used, and integral extrusion molding was performed. As for temperature settings, the temperature of the barrel 6 was set lower than a decomposition temperature range of the blowing agent, and the temperature of the shaping die 4 was set within the foaming temperature range in which decomposition and foaming occur. Thus, the temperature settings were such that the thermoplastic resin was sufficiently plasticized in the barrel 6, but the blowing agent was practically not decomposed therein, the blowing agent temperature was increased to the foaming temperature range in the shaping die 4 immediately prior to introduction in the cooling die 5, and the molten blended mixture was introduced in the cooling die 5 as the decomposition reaction of the blowing agent proceeded. More specifically, the settings were such that the temperature below the hopper of the barrel 6 was 140° C., the temperature in the vicinity of the breaker plate 7 was 170° C., and the temperature varied therebetween with a constant gradient. The temperature of the shaping die 4 was set to 185° C. The die A was constituted by the shaping die 4 and cooling die 5, and no core body was used. A Teflon coating was provided on the inner wall surface of the cooling die 5 and shaping die 4. The C surface treatment was performed in the corner portion in the direction along the resin flow that was formed by the two inner wall surfaces of the cooling die 5.

The molded body weight per unit length was measured and molding conditions were adjusted with consideration for lightweightness, while visually checking that no wood particles were exposed on the surface of the molded body discharged from the outlet port of the cooling die and the surface was in the mirror finish state. More specifically, temperature settings of the extrusion molding machine, rotation speed of the screw, feed rate of starting materials, temperature settings of the profile extrusion die, and take-in rate of a take-in machine were adjusted and molded bodies were obtained by cutting to the predetermined length.

The obtained molded bodies were left to stay for 3 days to be cooled in the air. The above-described measurements and evaluations were then performed respectively. The measurement and evaluation results are shown in Table 2 and Table 3. No problems were associated with moldability.

Examples 2 to 8 and Examples 10 to 14

Samples were prepared by compounding the starting materials shown in Table 1 at compounding ratios shown in Table 1, and extrusion molding was performed in the same manner as in Example 1. The obtained woody resin molded bodies were machined with commercial automatic planer and belt sander for angular natural wood materials on four molded surfaces to obtain an almost identical thickness between the opposite surfaces, that is, by about 3 mm each and about 1 mm each, and polished to obtain a rectangular parallelepiped with a cross-sectional shape of 150 mm×30 mm.

All the obtained polished bodies had a cross-section similar to that shown in FIG. 1. The above-described measurements and evaluations were then performed. The measurement and evaluation results are shown in Table 2 and Table 3.

No problems were associated with moldability in Examples 2 to 8 and Examples 10 to 14, but in Examples 5 to 7, Examples 10 to 12, and Example 14 in which HDPE, which is a resin having lubricating properties, and UHMWPE, PE-WAX, and paraffin wax, which are lubricants, were used, the range of molding conditions that could be used was wide and it was confirmed that the compositions tended to be easily moldable.

Example 9

Sample preparation, molding, measurements, and evaluation were performed in the same manner as in Example 2, except that a die with a cross-sectional shape of 66 mm×42 mm (die B) was used as the profile extrusion die, the molded body was machined on four molded surfaces with the above-described automatic planer and belt sander and a rectangular parallelepiped with a cross-sectional shape of 60 mm×40 mm was obtained. The obtained polished body had a cross-section similar to that shown in FIG. 1. The measurement and evaluation results are shown in Table 2 and Table 3.

The die B had a release-compression-release structure similar to that of the die A and had no core body. Furthermore, a Teflon coating was provided on the inner wall surfaces of the cooling die and shaping die. However, by contrast with the die A, no corner R treatment or C surface treatment was performed in the corner portion in the direction along the resin flow that was formed by the two inner wall surfaces of the cooling die. No problems were associated with the moldability level, but comparing with Example 2 in which the composition was the same, while the shaping die and cooling die were different, the molded body was sometimes caught in the corner portions inside the cooling die and hair cracking occurred in the molded body. It was thus confirmed that the range of molding conditions that could be used was narrower than that of Example 2.

Comparative Example 1

Sample preparation, molding, measurements, and evaluation were performed in the same manner as in Example 2, except that no blowing agent was used. The measurement and evaluation results are shown in Table 2 and Table 3.

Comparative Example 2

The pretreatment was performed by using the composition shown in Table 2 by the procedure similar to that of Example 1, but the obtained pretreated mixture was in a powdered state similar to that of the original wood powder and was different from that of Example 1 in which the resin functioned as a binder and the wood particles were in an aggregated state. The blowing agent was blended in the cooling mixer, as in Example 1, and molding was attempted, but no solidification occurred and a molded body could not be obtained.

Comparative Example 3

Figure 4:
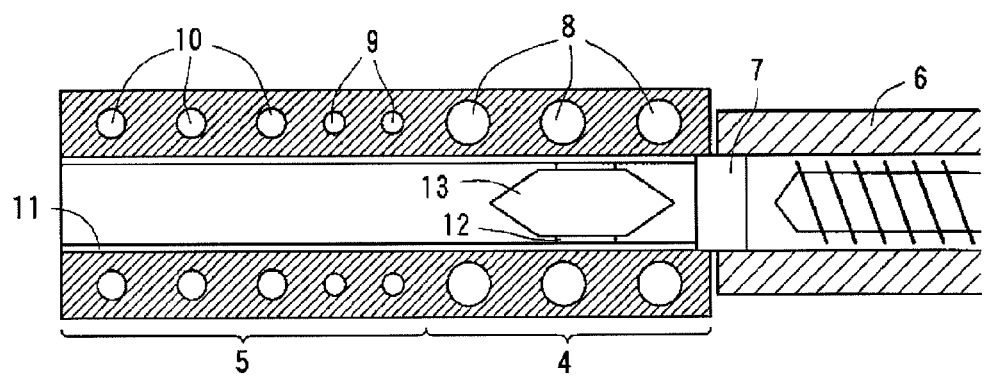
FIG. 4 is a schematic cross-sectional view illustrating an example of a profile extrusion die for use in foaming and extrusion molding of the conventional woody resin molded body using a core body.

A comparative test was conducted according to a Celuka process described in Patent Document 1 and Patent Document 2. Sample preparation, extrusion molding, and polishing were performed in the same manner as in Example 2, except that a profile extrusion die with a cross-sectional shape of 156 mm×32 mm (die C) having a core body shown in FIG. 4 was used, and measurements and evaluation were conducted. In the die C, a Teflon coating was provided on the inner wall surfaces of the cooling die 5 and shaping die 4. Furthermore, the C surface treatment was performed in the corner portion in the direction along the resin flow that was formed by the two inner wall surfaces of the shaping die 4. Similarly to the examples, the measurement and evaluation results are shown in Table 2 and Table 3.

Although the specific gravity was somewhat lower and the weight was reduced as compared to those obtained in Example 2 in which the woody resin composition was the same and the cross-sectional shape of the woody resin polished body was also the same, the flexural modulus and bending strength demonstrated extremely low values that were below the decreased ratio in specific gravity. When a fracture surface of the sample was observed after the flexural modulus and bending strength had been measured, a state was confirmed in which some cracks ran along the interface that could be considered as a weld line. It can be easily inferred that if a weld line is present inside the molded body, the weld line will prevent stresses from dissipating to the entire molded body, thereby decreasing flexural modulus and bending strength. It was thus assumed that the low values of the flexural modulus and bending strength were due to the presence of weld lines.

Comparative Example 4

Extrusion molding and polishing were conducted in the same manner as in Example 2, except that the molding conditions were changed, and measurements and evaluation were performed. Among the molding conditions, the temperature settings were changed. The temperature of the barrel 6 was set so as to reach the foaming temperature range of the blowing agent. Thus, the temperature was set so as to cause the decomposition of the blowing agent inside the barrel 6 solely so that the decomposition reaction be completed by the time the composition is introduced in the cooling die 5. More specifically, the temperature was set such that uniformly exceeded by 20° C. the set temperature of the barrel 6 and shaping die of Example 2.

As a result, the low-expanded foam layer that appeared at the end surface became indistinct for visual observations. Similarly to the examples, the measurement and evaluation results are shown in Table 2 and Table 3.

TABLE 1

| | Woody resin composition (parts by weight) | | | | | | | | | | | | |
|---|---|---|---|---|---|---|---|---|---|---|---|---|---|
| | PP | HDPE | GPPS | UHMWPE | PE-WAX | Paraffin wax | Commercial wood chips | Wood waste | Compatibility-improving agent | Blowing agent | Profile extrusion die | Molding method | Surface polishing |
| Example 1 | 50 | — | — | — | — | — | 50 | — | 3 | 1 | Die A | Foaming and extrusion molding | No |
| Example 2 | 50 | — | — | — | — | — | 50 | — | 3 | 1 | Die A | Foaming and extrusion molding | Yes |
| Example 3 | 60 | — | — | — | — | — | 50 | — | 3 | 1 | Die A | Foaming and extrusion molding | Yes |
| Example 4 | 35 | — | — | — | — | — | 50 | — | 3 | 1 | Die A | Foaming and extrusion molding | Yes |
| Example 5 | — | 50 | — | — | — | — | 50 | — | 3 | 1 | Die A | Foaming and extrusion molding | Yes |
| Example 6 | — | 30 | 20 | — | — | — | 50 | — | 3 | 1 | Die A | Foaming and extrusion molding | Yes |
| Example 7 | 45 | — | — | 5 | — | — | 50 | — | 3 | 1 | Die A | Foaming and extrusion molding | Yes |
| Example 8 | 50 | — | — | — | — | — | — | 50 | 3 | 1 | Die A | Foaming and extrusion molding | Yes |
| Example 9 | 50 | — | — | — | — | — | 50 | — | 3 | 1 | Die B | Foaming and extrusion molding | Yes |
| Example 10 | 20 | 25 | — | — | — | — | 50 | — | 3 | 1 | Die A | Foaming and extrusion molding | Yes |
| Example 11 | 45 | — | — | — | 2 | — | 50 | — | 3 | 1 | Die A | Foaming and extrusion molding | Yes |
| Example 12 | 45 | — | — | — | — | 2 | 50 | — | 3 | 1 | Die A | Foaming and extrusion molding | Yes |
| Example 13 | 30 | — | — | — | — | — | 70 | — | 3 | 1 | Die A | Foaming and extrusion molding | Yes |
| Example 14 | 20 | 25 | — | — | — | — | 50 | — | 3 | 3 | Die A | Foaming and extrusion molding | Yes |
| Comparative Example 1 | 50 | — | — | — | — | — | 50 | — | 3 | — | Die A | Non-foaming and extrusion molding | Yes |

TABLE 1-continued

| | Woody resin composition (parts by weight) | | | | | | | | | | | | |
|---|---|---|---|---|---|---|---|---|---|---|---|---|---|
| | PP | HDPE | GPPS | UHMWPE | PE-WAX | Paraffin wax | Commercial wood chips | Wood waste | Compatibility-improving agent | Blowing agent | Profile extrusion die | Molding method | Surface polishing |
| Comparative Example 2 | 4 | — | — | — | — | — | 96 | — | 3 | 1 | Die A | Foaming and extrusion molding | Yes |
| Comparative Example 3 | 50 | — | — | — | — | — | 50 | — | 3 | 1 | Die C | Foaming and extrusion molding | Yes |
| Comparative Example 4 | 50 | — | — | — | — | — | 50 | — | 3 | 1 | Die A | Foaming and extrusion molding | Yes |

TABLE 2

| | Thickness of low-expanded foam layer (mm) | Wood feel | Specific gravity | Flexural modulus (MPa) | Bending strength (MPa) | Easiness of nail driving | Easiness of screw driving | Weld line in low-expanded foam layer | Coatability |
|---|---|---|---|---|---|---|---|---|---|
| Example 1 | 7 (including surface portion) | — | 0.89 | 2700 | 28 | No problem | No problem | None | — |
| Example 2 | 5 | Yes | 0.88 | 2700 | 28 | No problem | No problem | None | Improved |
| Example 3 | 6 | Yes | 0.90 | 2500 | 26 | No problem | No problem | None | Improved |
| Example 4 | 5 | Yes | 0.92 | 2900 | 23 | No problem | No problem | None | Improved |
| Example 5 | 6 | Yes | 0.91 | 2300 | 22 | No problem | No problem | None | Improved |
| Example 6 | 5 | Yes | 0.91 | 2900 | 20 | No problem | No problem | None | Improved |
| Example 7 | 5 | Yes | 0.90 | 2600 | 25 | No problem | No problem | None | Improved |
| Example 8 | 5 | Yes | 0.90 | 2800 | 27 | No problem | No problem | None | Improved |
| Example 9 | 8 | Yes | 0.90 | 2400 | 27 | No problem | No problem | None | Improved |
| Example 10 | 5 | Yes | 0.92 | 2500 | 28 | No problem | No problem | None | Improved |
| Example 11 | 5 | Yes | 0.89 | 2300 | 24 | No problem | No problem | None | Improved |
| Example 12 | 5 | Yes | 0.90 | 2400 | 26 | No problem | No problem | None | Improved |
| Example 13 | 5 | Yes | 0.92 | 3000 | 28 | No problem | No problem | None | Improved |
| Example 14 | 5 | Yes | 0.90 | 2400 | 25 | No problem | No problem | None | Improved |
| Comparative Example 1 | — | Yes | 1.08 | 3200 | 34 | Hard and driving is difficult | Hard and driving is difficult | None | Improved |
| Comparative Example 2 | | | | Molding impossible | | | | | |
| Comparative Example 3 | 5 | Yes | 0.86 | 1600 | 13 | No problem | No problem | Yes (due to fixing member of core body) | Improved |
| Comparative Example 4 | Indistinct | Yes | 0.90 | 1800 | 23 | No problem | No problem | None | Improved |

TABLE 3

| | Specific gravity | | | | | Thickness of boundary layer (mm) | Foaming uniformity ($\sigma/A$) | |
|---|---|---|---|---|---|---|---|---|
| | Low-expanded foam layer X | High-expanded foam layer Y | Non-foamed body Z | X − Y | Z/X | Z/Y | Low-expanded foam layer | High-expanded foam layer |
| Example 1 | 1.0 | 0.8 | 1.1 | 0.2 | 1.10 | 1.38 | 4 | 0.09 | 0.06 |
| Example 2 | 1.0 | 0.8 | 1.1 | 0.2 | 1.10 | 1.38 | 4 | 0.09 | 0.06 |
| Example 3 | 1.0 | 0.9 | 1.1 | 0.1 | 1.10 | 1.22 | 4 | 0.08 | 0.06 |
| Example 4 | 1.0 | 0.8 | 1.1 | 0.2 | 1.10 | 1.38 | 4 | 0.10 | 0.12 |
| Example 5 | 1.0 | 0.9 | 1.1 | 0.1 | 1.10 | 1.22 | 4 | 0.08 | 0.06 |
| Example 6 | 0.9 | 0.7 | 1.1 | 0.2 | 1.22 | 1.57 | 4 | 0.10 | 0.21 |
| Example 7 | 1.0 | 0.8 | 1.1 | 0.2 | 1.10 | 1.38 | 4 | 0.09 | 0.15 |
| Example 8 | 1.0 | 0.8 | 1.1 | 0.2 | 1.10 | 1.38 | 4 | 0.08 | 0.06 |
| Example 9 | 1.0 | 0.7 | 1.1 | 0.3 | 1.10 | 1.57 | 5 | 0.09 | 0.07 |
| Example 10 | 1.0 | 0.7 | 1.1 | 0.3 | 1.10 | 1.57 | 4 | 0.08 | 0.06 |
| Example 11 | 1.0 | 0.8 | 1.1 | 0.2 | 1.10 | 1.38 | 4 | 0.07 | 0.13 |
| Example 12 | 1.0 | 0.8 | 1.1 | 0.2 | 1.10 | 1.38 | 4 | 0.09 | 0.10 |
| Example 13 | 1.1 | 0.9 | 1.2 | 0.2 | 1.10 | 1.33 | 4 | 0.11 | 0.17 |

TABLE 3-continued

| | Specific gravity | | | | | | Thickness of | Foaming uniformity (σ/A) | |
|---|---|---|---|---|---|---|---|---|---|
| | Low-expanded foam layer X | High-expanded foam layer Y | Non-foamed body Z | X − Y | Z/X | Z/Y | boundary layer (mm) | Low-expanded foam layer | High-expanded foam layer |
| Example 14 | 0.9 | 0.7 | 1.1 | 0.2 | 1.22 | 1.57 | 4 | 0.09 | 0.10 |
| Comparative Example 1 | — | — | — | — | — | — | — | — | — |
| Comparative Example 2 | — | — | — | — | — | — | — | — | — |
| Comparative Example 3 | 1.0 | 0.8 | 1.1 | 0.2 | 1.10 | 1.38 | 4 | 0.10 | 0.08 |
| Comparative Example 4 | Indistinct, measurements impossible | | 1.1 | — | — | — | — | — | — |

INDUSTRIAL APPLICABILITY

The woody resin molded body in accordance with the present invention is a building material that has excellent balance of good mechanical properties and secondary processability and can be advantageously used mainly as an exterior material. In particular, it can be advantageously used as a floor material for outdoor use, such as a deck material, and also parts for fences, verandas, gate doors, gate posts, signboards, planters, pergolas, wisteria trellises, outdoor furniture, and composters.

The invention claimed is:

1. A woody resin molded body containing a thermoplastic resin and a cellulose powder at a weight ratio of 20/80 to 80/20, characterized in that the woody resin molded body has a substantially uniform high-expanded foam layer and a low-expanded foam layer formed on the outside of the high-expanded foam layer, and a boundary layer having a specific gravity that changes in a thickness direction of the woody resin molded body provided between the high-expanded foam layer and the low-expanded foam layer,
    a thickness of the low-expanded foam layer is equal to or greater than 1 mm and equal to or less than one third of a thickness of the woody resin molded body,
    a thickness of the boundary layer is equal to or less than one fifth of a thickness of the woody resin molded body,
    the cellulose powder is not exposed on a surface of the low-expanded foam layer, and the woody resin molded body has no weld lines.

2. The woody resin molded body according to claim 1, characterized in that the following relationships are simultaneously satisfied:

$$0.1 \leq X-Y \leq 0.5,$$

$$0.80Z \leq X \leq 0.99Z,$$

$$0.50Z \leq Y \leq 0.85Z,$$

where X represents a specific gravity of the low-expanded foam layer, Y represents a specific gravity of the high-expanded foam layer, and Z represents a specific gravity of a non-foamed body of a woody resin composition wherein the non-foamed body has the same composition as the two foamed layers.

3. The woody resin molded body according to claim 1, characterized in that the thermoplastic resin comprises a lubricant.

4. The wood y resin molded body according to claim 3, characterized in that the lubricant is at least one kind selected from the group consisting of polyethylene for molding, polyethylene wax, polypropylene wax, an ultrahigh molecular weight polyethylene, and paraffin wax.

5. The woody resin molded body according to claim 1, characterized in that the woody resin molded body has a flexural modulus which is equal to or greater than 2,000 MPa.

6. A woody resin polished body, characterized in that the wood resin polished body is obtained by polishing at least part of the low-expanded foam layer of the woody resin molded body according to claim 1, and has a surface on which the cellulose powder is exposed.

7. A woody resin molded body containing a thermoplastic resin and a cellulose powder at a weight ratio of 20/80 to 80/20, characterized in that the woody resin molded body has a substantially uniform high-expanded foam layer and a low-expanded foam layer formed on the outside of the high-expanded foam layer, and a boundary area having a specific gravity that changes in a thickness direction of the woody resin molded body provided between the high expanded foam layer and the low-expanded foam layer, a thickness of the low-expanded foam layer is equal to or greater than 1 mm and equal to or less than one third of a thickness of the woody resin molded body, a thickness of the boundary layer is equal to or less than one fifth of a thickness of the woody resin molded body, the cellulose powder is not exposed on a surface of the low-expanded foam layer, and the woody resin molded body has no weld lines;
    wherein the woody resin molded body further contains a blowing agent,
    and the woody resin molded body is manufactured by a process comprising a step of passing a woody resin composition through a shaping die that has no core body and extruding the woody resin composition into a cooling die, characterized in that a barrel temperature of an extrusion molding machine is set lower than a foaming temperature of the blowing agent, and a temperature of the shaping die is set within a foaming temperature range et the blowing agent.

* * * * *